(No Model.)

J. RAIBLE.
TIRE UPSETTER.

No. 262,473. Patented Aug. 8, 1882.

Witnesses
William H. Mortimer.
Wil. H. Kerw.

Inventor
Jno. Raible,
per
F. A. Lehmann,
Att'y

UNITED STATES PATENT OFFICE.

JOHN RAIBLE, OF VERONA, PENNSYLVANIA.

TIRE-UPSETTER.

SPECIFICATION forming part of Letters Patent No. 262,473, dated August 8, 1882.

Application filed December 29, 1881. (No model.)

*To all whom it may concern:*

Be it known that I, JOHN RAIBLE, of Verona, in the county of Allegheny and State of Pennsylvania, have invented certain new and useful Improvements in Machines for Upsetting Tires; and I do hereby declare the following to be a full, clear, and exact description of the invention, such as will enable others skilled in the art to which it pertains to make and use it, reference being had to the accompanying drawings, which form part of this specification.

My invention relates to an improvement in machines for upsetting tires; and it consists in the combination and arrangement of parts which will be more fully described hereinafter, whereby the tire is held while being upset and prevented from bulging in between the clamps.

Figure 1:
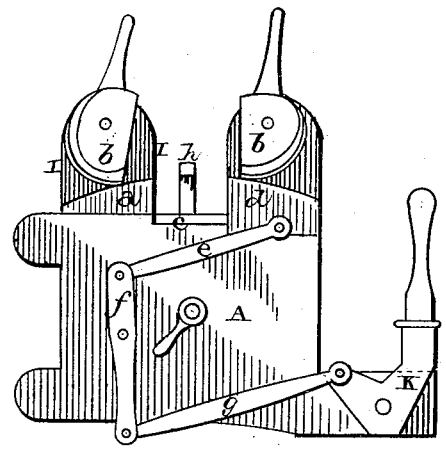
Figure 2:
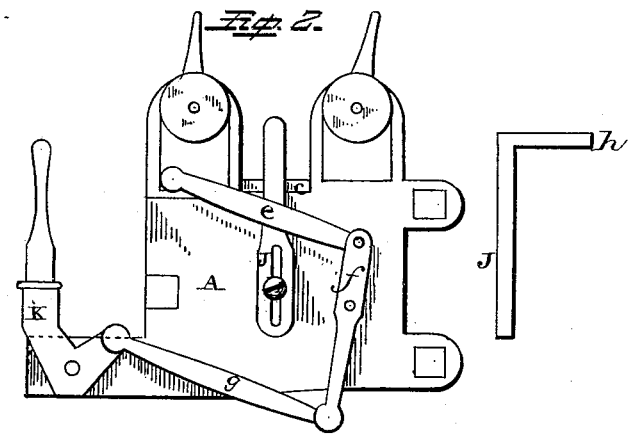

Figures 1 and 2 are side elevations of my invention, taken at right angles to each other.

A represents a suitable rectangular frame, which is to be secured to the wall or other support at a sufficient height above the ground or floor to allow the free movement of the levers, and with room enough underneath for the tire to turn around. Upon one of the upper corners of this frame is formed the raised portion a, the top surface of which forms the segment of a circle. The top of this part a may be of any desired width, and at its rear side or edge is formed the vertical portion I, which serves as a bearing for the cam b. This cam, which may either be of the shape here shown or any other that may be preferred, and which may have either a smooth or serrated surface, is provided with a handle, by means of which its lower corner may be brought in direct contact with the surface of the part a, or made to clamp the tire tightly in position.

Upon the opposite upper corner of the frame A is placed a suitable block, d, which is constructed exactly like the part a, but which, instead of being stationary upon the frame, slides horizontally back and forth upon the top of the frame, and is guided in its movements by the flanges or guides which are formed upon the top of the frame. This sliding portion d is also provided with a clamp, b, for the purpose of holding the tire while it is being upset. This block d is made to move back and forth upon the top of the frame by means of the connecting-rod e, which has its lower end fastened to the upper end of the pivoted lever f. To the lower end of this lever f is fastened the connecting-rod g, which unites it with the large operating cranked lever K. This lever K is pivoted upon an extension which is formed upon one corner of the frame. In order that the block d may move evenly upon the frame, there are two sets of these levers and connecting-rods, one for each side of the frame. There may be two operating-levers K, one for each set of levers, or a single lever K may be made to operate both sets at once.

Secured to one side of the frame is the slotted gage J, which is made vertically adjustable, and which has its upper end turned at right angles so as to project over the top of the space between the two parts a d. The upper end, h, of this gage catches over the top of the tire and prevents an upward bulge in it while it is being pressed forward by the sliding block d.

The operation of my machine is as follows: The bar that is to be converted into a tire by upsetting, and which has its ends welded together, is heated and placed on top of the two curved surfaces a d, under the eccentrics, the sliding block d having been moved outward as far as possible by means of the levers. Having adjusted the cams to the proper distances from the plates to form clamps, the cranked lever or levers K are moved, by which the block which holds the tire firmly is moved toward the part a, forcing the bar or tire through the narrowed space between the top of the part a and its clamp b. The curved surfaces of the parts a b cause the heated bar by degrees to assume a circular form, and by repeated actions the tire is completed.

Should the tire be found too small when the operation is completed, it may be made larger by reversing the action of the clamp, by which the tire can be stretched to its proper size.

Having thus described my invention, I claim—

In a tire-upsetter, the combination of the frame A, having the rounded portion a, the sliding block d, the levers K f, links e g, cams b, and the slotted gage J, having the bent end h, to catch over the top of the tire between the cams, and thus prevent the tire from bulging, substantially as shown.

In testimony whereof I affix my signature in presence of two witnesses.

JOHN RAIBLE.

Witnesses:
LOUIS MOESER,
W. W. MORTIMER.